United States Patent [19]

Shimamura et al.

[11] Patent Number: 4,882,975
[45] Date of Patent: Nov. 28, 1989

[54] PARKING MAINTAINING APPARATUS FOR BRAKE BOOSTER

[75] Inventors: Morihiko Shimamura; Satoru Satoh; Michio Kobayashi, all of Saitama, Japan

[73] Assignee: Jidosha Kiki Co., Ltd., Tokyo, Japan

[21] Appl. No.: 283,061

[22] Filed: Dec. 9, 1988

[30] Foreign Application Priority Data

Dec. 25, 1987 [JP] Japan ................. 62-328927

[51] Int. Cl.$^4$ ............................................. F15B 9/00
[52] U.S. Cl. ................................ 91/376 R; 91/369.1; 192/1.35; 303/89
[58] Field of Search ............... 91/376 R, 459, 422, 91/369.1, 369.2, 369.3, 369.4; 60/547.1; 192/1.31, 1.33, 1.35, 1.23, 265; 188/356, 357, 353; 303/4, 89

[56] References Cited

U.S. PATENT DOCUMENTS

| 4,660,691 | 4/1987 | Messersmith et al. | 192/1.31 |
| 4,681,196 | 7/1987 | Fulmer et al. | 192/1.35 |
| 4,759,255 | 7/1988 | Shimamura | 91/376 R |
| 4,800,799 | 1/1989 | Nishii | 91/376 R |

FOREIGN PATENT DOCUMENTS

| 0173054 | 3/1986 | European Pat. Off. | 192/1.33 |
| 0105866 | 6/1983 | Japan | 91/363 R |

Primary Examiner—Randall L. Green
Assistant Examiner—Thomas Denion
Attorney, Agent, or Firm—Flynn, Thiel, Boutell & Tanis

[57] ABSTRACT

A parking maintaining apparatus includes a solenoid-operated open/close valve which opens or closes a constant pressure passage providing a communication between a valve mechanism and a constant pressure chamber of a brake booster. A relief valve is provided which relieves a pressure within the constant pressure passage into the constant pressure chamber when such pressure exceeds a given value. The provision of the relief valve allows the pressure within a variable pressure chamber to be maintained at or below the given value through the valve mechanism under a parking maintaining condition, whereby the pressure within the variable pressure chamber can be rapidly displaced as the parking maintaining condition is to be terminated, thus eliminating a partly braked condition.

5 Claims, 3 Drawing Sheets

U.S. Patent  Nov. 28, 1989  Sheet 1 of 3  4,882,975
F I G. 1
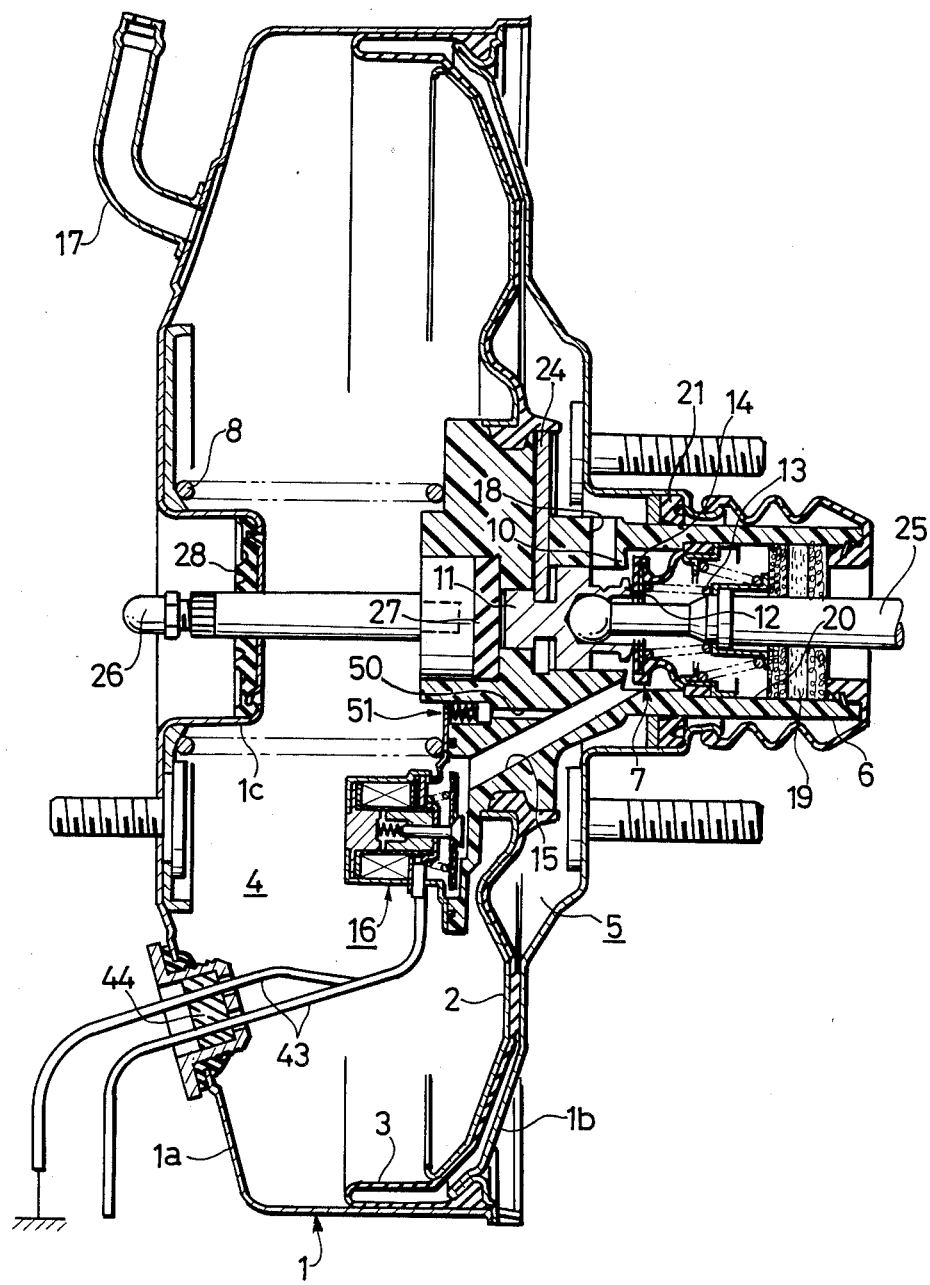

PARKING MAINTAINING APPARATUS FOR BRAKE BOOSTER

FIELD OF THE INVENTION

The invention relates to a brake booster to be mounted on a vehicle, and more particularly, to a parking maintaining apparatus for brake booster which enables a braking action to be continued or maintained after the release of a depressed brake pedal under a given condition.

DESCRIPTION OF THE PRIOR ART

Generally, a brake booster comprises a power piston slidably disposed within a shell, a valve mechanism contained within a valve body defined in an axial portion of the power piston, a constant pressure chamber defined forwardly of the power piston as viewed in the direction of operation thereof and connected to a source of negative pressure, a variable pressure chamber defined rearwardly of the power piston, as viewed in the direction of operation thereof, a plurality of passages including a constant pressure passage providing a communication between the valve mechanism and the constant pressure chamber, a variable pressure passage providing a communication between the valve mechanism and the variable pressure chamber and a pressure passage providing a communication between the valve mechanism and an atmospheric pressure, and an input shaft for operating a valve plunger, which forms part of the valve mechanism, to switch the communiction of the respective passages.

The valve mechanism is constructed so that when a brake pedal is depressed to drive the input shaft forward, a communication between the constant pressure passage and the variable pressure passage is interrupted while a communication is established between the variable pressure passage and the pressure passage, thus introducing a pressure fluid into the variable pressure chamber. When the brake pedal is now released to cause the input shaft to move back, a communication between the variable pressure passage and the pressure passage is interrupted while a communication is established between the variable pressure passage and the constant pressure passage, thus displacing the pressure fluid which has been introduced into the variable pressure chamber to the source of negative pressure through the constant pressure chamber.

There has been proposed a parking maintaining apparatus for the brake booster of the kind described and including a solenoid-operated open/close valve which opens and closes the constant pressure passage (see Japanese Patent Application No. 120,834/1986). In this arrangement, when the solenoid-operated valve is maintained open, a usual operation of a brake booster takes place. By providing an arrangement to close the solenoid-operated valve when a vehicle speed sensor detects that a vehicle has come to a stop as a result of a braking action, the release of the brake pedal which tends to establish a communication between the variable pressure chamber and the constant pressure chamber through the variable pressure passage and the constant pressure passage cannot allow the pressure fluid which has been introduced into the variable pressure chamber to be displaced to the source of low pressure through the constant pressure chamber since the solenoid-operated valve remains closed. Accordingly, the braking action can be maintained even after the brake pedal is released, and thus the brake booster can be used as a parking maintaining apparatus.

The parking maintaining condition can be terminated upon starting the vehicle. However, if a pressure fluid of unnecessarily high pressure is confined within the variable pressure chamber, it takes a certain length of time until the pressure fluid can be displaced externally, causing a partly braked condition.

SUMMARY OF THE INVENTION

In view of the foregoing, the invention provides a parking maintaining apparatus for brake booster in which a relief valve is provided to relieve the pressure within the constant pressure passage located between the valve mechanism and the solenoid-operated valve to the constant pressure chamber when such pressure becomes equal to or greater than a preset value.

With the arrangement of the invention, when a pressure fluid of unnecessarily high pressure is confined within the variable pressure chamber under the parking maintaining condition, the pressure fluid within the variable pressure chamber can be relieved to the constant pressure chamber through the variable pressure passage, the valve mechanism, the constant pressure passage and the relief valve, thus allowing the pressure within the variable pressure chamber to be maintained below the preset value which is established by the relief valve. In this manner, when the parking maintaining condition is to be terminated, the pressure within the variable pressure chamber can be rapidly reduced, thus eliminating the partly braked condition.

Since the relief valve is originally designed to relieve the pressure within the constant pressure passage into the constant pressure chamber, the normal braking action cannot be adversely influenced if the relief valve is provided. By depressing a brake pedal to a greater degree, the pressure within the variable pressure chamber can be raised above the preset value.

Above and other objects and advantages of the invention will become apparent from the following description of an embodiment thereof with reference to the attached drawings.

BRIEF DESCRIPTION OF THE DRAWINGS

FIG. 1 is a cross section showing one embodiment of the invention; and

DETAILED DESCRIPTION OF EMBODIMENTS

Figure 2:
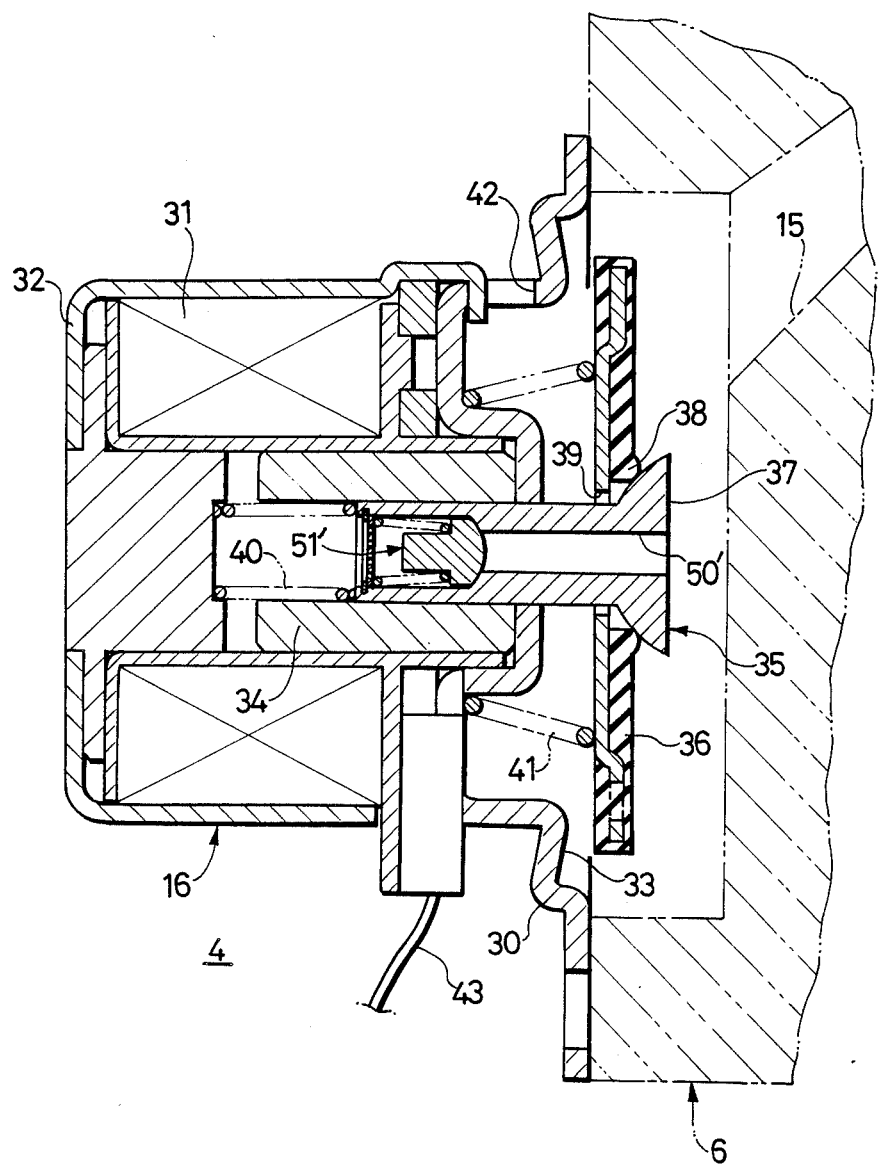
FIGS. 2 and 3 are fragmentary cross sections of other embodiments of the invention.

Referring to the drawings, several embodiments of the invention will be described. Initially referring to FIG. 1, a brake booster includes a shell 1 which comprises a front shell 1a, and a rear shell 1b. A power piston 2 is slidably disposed within the shell 1, and a diaphragm 3 is applied to the back surface of the power piston 2 so that the combination of the power piston 2 and the diaphragm 3 divides the interior of the shell 1 into a forwardly located, constant pressure chamber 4 and a rearwardly located, variable pressure chamber 5.

An axial portion of the power piston 2 is integrally formed with a valve body 6, in which a valve mechanism 7, which switches a fluid path, is contained. The power piston 2 and the valve body 6 are normally maintained in their inoperative positions, shown, by means of a return spring 8.

The valve mechanism 7 comprises a first valve seat 10 formed on the valve body 6, a second valve seat 12 formed on a valve plunger 11, and a valve element 14 adapted to be seated upon either valve seat 10 or 12 from the rear side of the power piston 2, or from the right-hand side, as viewed in FIG. 1, under the resilience of a spring 13. A region located externally of a seal defined between the valve seat 10 and the valve element 14 communicates with the constant pressure chamber 4 through a constant pressure passage 15 and a solenoid-operated open/close valve 16. The constant pressure chamber 4 communicates with a source of negative pressure such as an intake manifold of an engine, not shown, through a piping 17 mounted on the shell 1 which is utilized to introduce a negative pressure.

A region located intermediate a seal defined between the first valve seat 10 and the valve element 14 and another seal defined between the second valve seat 12 and the valve element 14 communicates with the variable pressure chamber 5 through a variable pressure passage 18 which is formed in the valve body 6. Finally, a region located inside a seal defined between the second valve seat 12 and the valve element 14 communicates with the atmosphere through a pressure passage 20 in which a filter 19 is disposed. It is to be noted that the variable pressure chamber 5 is hermetically sealed against the exterior by a seal member 21 through which the valve body 6 is slidable.

The valve plunger 11, which forms the valve mechanism 7, is prevented from being withdrawn from the valve body 6 by means of a key member 24, and has its one end connected to an input shaft 25 which is in turn mechanically coupled to a brake pedal, not shown. The front end face of the valve plunger 11 is disposed in opposing relationship with an end face of an output shaft 26, with a reaction disc 27 interposed between the opposing surfaces. An axial portion of the front shell 1a is formed with a cylindrical reentrant extension 1c in which a seal member 28 is disposed, which allows an output shaft 26 to extend slidably therethrough to project externally of the shell 1 for connection with a piston of a master cylinder, not shown.

The solenoid-operated valve 16 is disposed within the constant pressure chamber 4 and is mounted on the valve body 6 at a location outside and below the coiled return spring 8 for opening and closing the constant pressure passage 15 formed in the valve body 6.

FIG. 2 shows another embodiment of the invention which differs from the arrangement shown in FIG. 1. Referring to FIG. 2, the construction of the solenoid-operated open/close valve 16 mentioned above will be described. Specifically, the valve 16 comprises a substantially dish-shaped casing 30 which is mounted on the valve body 6 in a hermetically sealed manner so as to cover an opening of the constant pressure passage 15 into the constant pressure chamber 4, and a substantially cup-shaped casing 32 integrally connected to the casing 30 and containing a ring-shaped solenoid 31 therein. The dish-shaped casing 30 is formed with a step, on the right end face of which is defined a valve seat 33. A plunger 34 is disposed for sliding movement through an axial portion of the solenoid 31, and is provided with valve means 35 which is adapted to be seated upon the valve seat 33.

The valve means 35 comprises an annular valve element 36 of an increased diameter having an outer peripheral portion which is adapted to be seated upon the valve seat 33 from the right hand thereof, and a poppet-type valve element 37 which slidably extends through an axial portion of the valve element 36 and which is a press fit into the plunger 34. The poppet-type valve element 37 is adapted to be seated upon a valve seat 38, which is formed around the inner periphery of the annular valve element 36, to close a passage 39 formed in the axial portion of the valve element 36.

The plunger 34 and the poppet valve element 37 are normally maintained in their inoperative positions shown by a spring 40, and another spring 41 is disposed between the annular valve element 36 and the dish-shaped casing 30 for normally maintaining the valve seat 38 on the valve element 36 in abutment against the poppet valve element 37 which assumes its inoperative position, thus maintaining it in its inoperative position. Under this condition, the annular valve element 36 is spaced from the valve seat 33 formed on the dish-shaped casing 30, whereby the constant pressure passage 15 communicates with the constant pressure chamber 4 through a clearance between the valve element 36 and the valve seat 33 and a passage 42 formed in the casing 30.

As shown in FIG. 1, harnesses 43 extending from the solenoid-operated valve 16 are taken out through seal means 44 mounted on the front shell 1a for connection with a controller, not shown, which includes a microcomputer.

In the embodiment shown in FIG. 1, a bypass passage 50 is formed in the valve body 6 to establish a communication between the constant pressure chamber 4 and the constant pressure passage 15 extending between the valve mechanism 7 and the solenoid-operated valve 16. A relief valve 51 is disposed in the bypass passage 50 for relieving the pressure from the constant pressure passage 15 into the constant pressure chamber 4 whenever such pressure exceeds a given value.

In the described arrangement, the controller mentioned above maintains the solenoid-operated valve 16 open, and accordingly, when the brake booster is inoperative, a negative pressure which is introduced into the constant pressure chamber 4 through the piping 17 is allowed to be introduced into the constant pressure passage 15 through the solenoid-operated valve 16, namely, through the passage 42 and the clearance between the valve element 36 and the valve seat 33, and thence into the variable pressure chamber 5 through the valve mechanism 7 and the variable pressure passage 18.

Accordingly, no fluid pressure differential is developed across the power piston 2 under this condition, and hence the brake booster maintains its inoperative condition shown, in a similar manner as with a conventional brake booster which is not provided with the solenoidoperated valve 16. When a brake pedal is now depressed under this inoperative condition, it will be apparent that the brake booster is capable of producing a braking force which depends on the degree of depression of the brake pedal, generally in a similar manner as in a conventional brake booster.

When the brake booster mentioned above is to be operated as a parking maintaining apparatus, the controller mentioned above energizes the solenoid 31 of the solenoid-operated valve 16 when the controller mentioned above determines that a given requirement to maintain the parking condition is satisfied in response to outputs from various sensors, not shown, for example, when the vehicle is at rest and when the brake pedal continues to be depressed over a given length of time after the vehicle has come to a stop. Thereupon, the two valve elements 36, 37 are driven integrally to the left against the resilience of the springs 40, 41, causing the valve element 36 to be seated upon the valve seat 33 to close the solenoid-operated valve 16.

At the moment the solenoid-operated valve 16 is closed, the brake pedal assumes its depressed position, and hence a fluid pressure which depends on the degree of depression of the brake pedal is introduced into the variable pressure chamber 5. Since the solenoid-operated valve 16 is closed, if the brake pedal is now released to establish a communication between the variable pressure passage 18 and the constant pressure passage 15, the brake pressure within the variable pressure chamber 5 cannot be displaced into the constant pressure chamber 4. Accordingly, the braking action of a magnitude which depends on the fluid pressure is maintained even after the brake pedal ceases to be depressed.

When a fluid pressure of unnecessarily high pressure is confined within the variable pressure chamber 5 under such condition, pressure fluid within the variable pressure chamber 5 can be relieved into the constant pressure chamber 4 through the variable pressure passage 18, the valve mechanism 7, the constant pressure passage 15, the bypass passage 50 and the relief valve 51, whereby the pressure within the variable pressure chamber 5 can be maintained at or below a given value established by the relief valve 51.

On the other hand, since it is possible to introduce a fluid pressure which depends on the degree of depression of the brake pedal into the variable pressure chamber 5, the pressure within the variable pressure chamber 5 can be increased above the preset value by strongly depressing the brake pedal even under the parking maintaining condition, in a similar manner as in a usual operation.

When the controller mentioned above detects the starting operation of the vehicle under the parking maintaining condition, it deenergizes the solenoid 31 of the solenoid-operated valve 16, whereupon the fluid pressure acting upon the two valve elements 36, 37 urges them against the valve seats 33, 38, respectively, initially causing the poppet valve element 37 having a reduced diameter, and hence having a reduced pressure responsive area, to be driven to the right under the resilience of the spring 40 to move away from the valve seat 38 on the annular valve element 36.

The constant pressure passage 15 is then allowed to communicate with the constant pressure chamber 4 through the passage 39 formed in the axial portion of the annular valve element 36, whereby the pressure within the constant pressure passage 15 decreases until it reaches or reduces below a given value, whereupon the annular valve element 36 is readily moved away from the valve seat 33 by the spring 41. Thus, the constant pressure passage 15 communicates with the constant pressure chamber 4 through an increased channel area, rapidly reducing the pressure within the constant pressure passage 15 or the variable pressure chamber 5.

At this time, the pressure within the variable pressure chamber 5 is maintained at or below a given value which is established by the relief valve 51, and hence is allowed to decrease rapidly, thus eliminating the partly braked condition as the parking maintaining condition is to be terminated.

In the embodiment shown in FIG. 2, a bypass passage 50' is formed in an axial portion of the poppet valve element 37, with a relief valve 51' assembled into the bypass passage 50'. In this embodiment, the pressure fluid which is exhausted from the constant pressure passage as the relief valve 51' is opened will be discharged toward the constant pressure chamber 4 through a bore, not shown, extending through a plug against which the left end of the spring 40 abuts.

Figure 3:
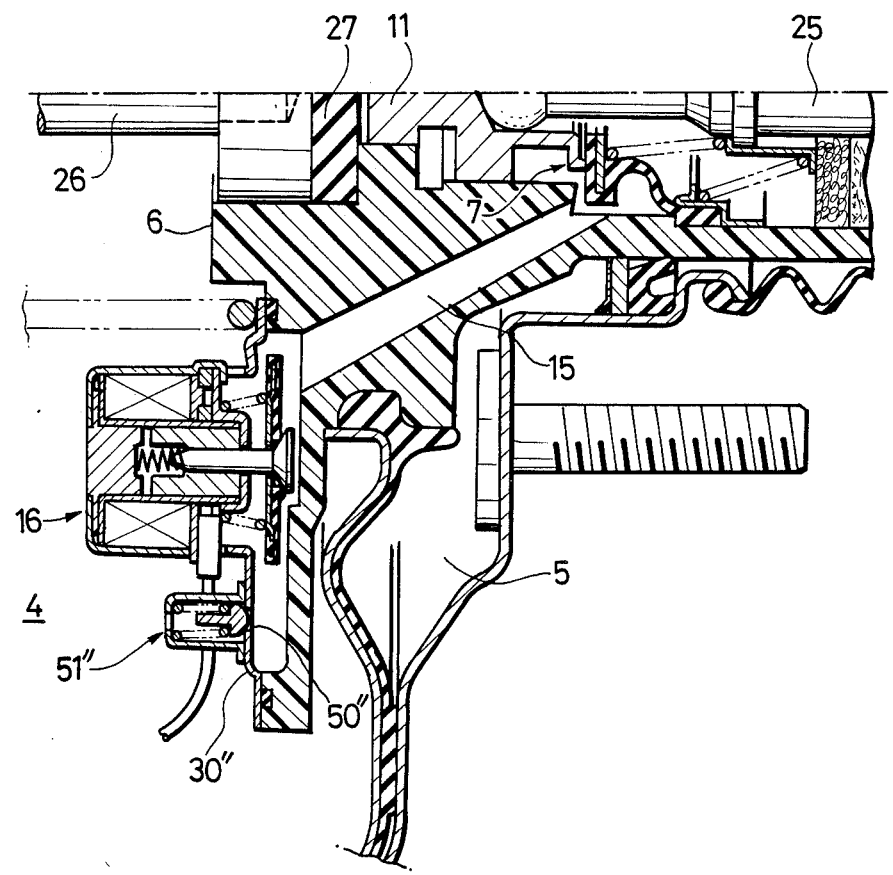

FIG. 3 shows a further embodiment of the invention in which a bypass passage 50" is formed in a casing 30" of the solenoid-operated valve 16 and can be opened and closed by a relief valve 51". In either instance, a similar effect is achieved as in the embodiment shown in FIG. 1.

While the invention has been shown and described above in connection with several embodiments thereof, it should be understood that a number of changes, modifications, and substitutions therein will readily occur to one skilled in the art without departing from the spirit and scope of the invention defined by the appended claims.

What is claimed is:

1. A parking maintaining apparatus for brake booster which comprises a power piston slidably disposed within a shell, a valve mechanism received in a valve body formed by an axial portion of the power piston, a constant pressure chamber defined forwardly of the power piston as viewed in the direction of operation thereof and communicating with a source of negative pressure, a variable pressure chamber defined rearwardly of the power piston as viewed in the direction of operation thereof, a plurality of passages formed in the valve body and including a constant pressure passage providing a communication between the valve mechanism and the constant pressure chamber, a variable pressure passage providing a communication between the valve mechanism and the variable pressure chamber and a pressure passage providing a communication between the valve mechanism and a source of high pressure, an input shaft for operating a valve plunger, which forms part of the valve mechanism, to switch the communication of the respective passages, and a solenoid-operated open/close valve for opening and closing the constant pressure passage;

the parking maintaining apparatus being characterized by a relief valve for relieving a pressure within the constant pressure passage extending between the valve mechanism and the solenoid-operated valve into the constant pressure chamber whenever such pressure reaches or exceeds a given value.

2. A parking maintaining apparatus according to claim 1 in which a bypass passage is formed in an axial portion of the valve body to provide a communication between the constant pressure passage and the constant pressure chamber, the relief valve being disposed in the bypass passage.

3. A parking maintaining apparatus according to claim 1 in which the solenoid-operated open/close valve comprises a casing containing a solenoid, a plunger slidably fitted into an axial portion of the solenoid, valve means connected to the plunger, and a valve seat formed on the casing, the plunger being operated when the solenoid is energized to cause its connected valve means to be seated upon the valve seat to close the constant pressure passage, further including a bypass passage formed in the valve means of the solenoid-operated valve for providing a communication between the bypass passage and the constant pressure chamber, with the relief valve disposed in the bypass passage.

4. A parking maintaining apparatus according to claim 3 in which the valve means comprises an annular valve element adapted to be seated upon the valve seat, and a poppet-type valve element connected to the plunger and slidably extending through an axial portion of the valve element, the poppettype valve element being adapted to be seated upon a valve seat formed around the inner periphery of the annular valve element to close a passage formed in an axial portion of the annular valve element, the bypass passage being defined in the poppet-type valve element.

5. A parking maintaining apparatus according to claim 1 in which the solenoid-operated open/close valve comprises a casing containing a solenoid, a plunger slidably fitted into an axial portion of the solenoid, valve means connected to the plunger, and a valve seat formed on the casing, the plunger being operated when the solenoid is energized to cause its connected valve means to be seated upon the valve seat to close the constant pressure passage, a bypass passage being formed in the casing of the solenoid-operated valve for providing a communication between the constant pressure passage and the constant pressure chamber, with the relief valve being disposed in the bypass passage.

* * * * *